(12) United States Patent
York

(10) Patent No.: US 6,711,709 B1
(45) Date of Patent: Mar. 23, 2004

(54) INTEGRATED BLOCK CHECKING SYSTEM FOR RAPID FILE TRANSFER OF COMPRESSED DATA

(75) Inventor: Kenneth Lindsay York, Huntington Valley, PA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/104,116

(22) Filed: Jun. 24, 1998

(51) Int. Cl.[7] ................................................. H04L 1/16
(52) U.S. Cl. ..................................................... 714/748
(58) Field of Search ......................................... 714/748

(56) References Cited

U.S. PATENT DOCUMENTS

| | | | | |
|---|---|---|---|---|
| 4,730,348 A | * | 3/1988 | MacCrisken | 375/122 |
| 4,829,526 A | * | 5/1989 | Clark et al. | 371/40 |
| 5,010,553 A | * | 4/1991 | Scheller et al. | 371/35 |
| 5,115,436 A | * | 5/1992 | McAuley | 714/781 |
| 5,130,993 A | * | 7/1992 | Gutman et al. | 371/42 |
| 5,280,600 A | * | 1/1994 | Van Maren et al. | 360/48 |
| 5,317,603 A | * | 5/1994 | Osterweil | 375/240 |
| 5,600,663 A | * | 2/1997 | Ayanoglu et al. | 714/774 |
| 5,608,738 A | * | 3/1997 | Matsushita | 714/752 |
| 5,673,322 A | * | 9/1997 | Pepe et al. | 705/52 |
| 5,680,400 A | | 10/1997 | York | 370/473 |
| 5,715,260 A | * | 2/1998 | Black et al. | 371/47.1 |
| 5,737,638 A | * | 4/1998 | Byrn et al. | 710/68 |
| 5,745,504 A | | 4/1998 | Bång | 371/37.1 |
| 6,008,743 A | * | 12/1999 | Jaquette | 341/51 |
| 6,012,159 A | * | 1/2000 | Fischer et al. | 714/755 |
| 6,021,433 A | * | 2/2000 | Payne et al. | 709/219 |
| 6,141,788 A | * | 10/2000 | Rosenberg et al. | 714/774 |
| 6,243,846 B1 | * | 6/2001 | Schuster et al. | 714/776 |

FOREIGN PATENT DOCUMENTS

| | | | |
|---|---|---|---|
| EP | 0652680 | 5/1995 | ............ H04Q/7/20 |
| EP | 0751643 | 1/1997 | ............. H04L/1/00 |

OTHER PUBLICATIONS

Clark, "Adaptive Source Coding Techniques for Communications Systems", Second IEE National Conference on Telecommunications, pp. 53–60, Dec. 1989.*

(List continued on next page.)

Primary Examiner—Stephen M. Baker
(74) Attorney, Agent, or Firm—John B. Sowell; Mark T. Starr

(57) ABSTRACT

In a system for enhancing the integrity of transmitted data files from one memory to a remotely located memory there is provided an original data stream which is compressed by a known data compression code. The compressed data stream may be in a variable length format and is not provided with the usual parity code bits. To assure that compressed data is received both without loss and error free, the compressed data stream is divided into groups of n blocks having N bytes. At the end of the group of nN byte blocks, a block or check code is inserted into the compressed data stream. The transmitted and received compressed data stream is processed as n blocks of N bytes having a received block check code. The received blocks of data are used to generate new block check codes which are compared with the transmitted block check codes to determine if a one bit error has occurred in any of the n blocks of N bytes. If an error occurs in the transmission of compressed data, the block is not stored in the memory of the receiver and the transmitter is requested to resend the entire group of n blocks of N bytes until no error in transmission is detected. The same system for enhancing the integrity of a transmitted data file can be employed with data that is double data compressed and/or encrypted.

5 Claims, 7 Drawing Sheets

OTHER PUBLICATIONS

Holtz, "The Evolution of Lossless Data Compression Techniques", WESCON '93, pp. 140–145, Sep. 1993.*

Burton et al., "Errors and Error Control", Proc. IEEE, vol. 60, No. 11, Nov. 1972, pp. 1293–1301, Nov. 1972.*

Kinsner et al., "The Lempel–Ziv–Welch (LZW) Data Compression Algorithm for Packet Radio", WESCANEX '91, pp. 225–229.*

Holtz, "Data Compression for Disc Files and Communication Networks", WESCON '93, pp. 146–151.*

Kawahara et al., "Forward Error Correction in ATM Networks: An Analysis of Cell Loss Distribution in a Block", INFOCOM '94, pp. 1150–1159.*

Macker, "Reliable Multicast Transport and Integrated Erasure–Based Forward Eror Correction", MILCOM '97, pp. 973–977.*

* cited by examiner

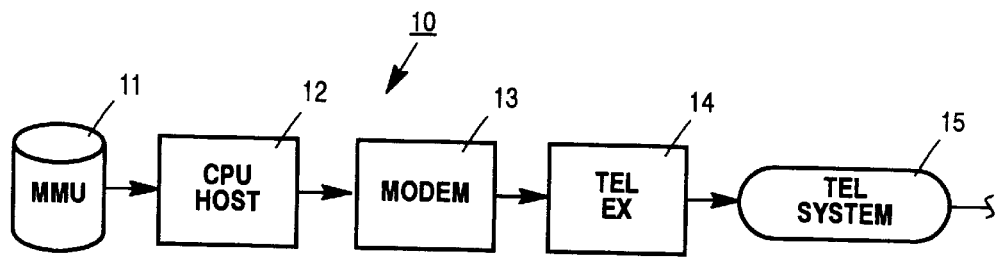
Figure 1 *(Prior Art)*
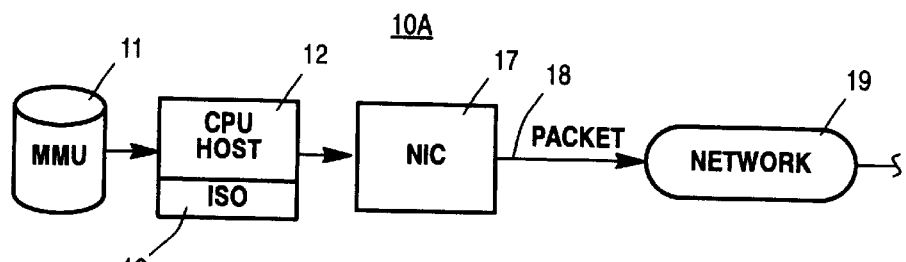
Figure 2 *(Prior Art)*
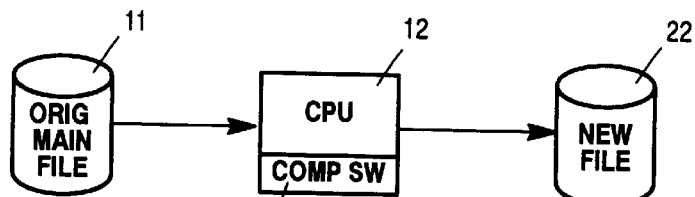
Figure 3A *(Prior Art)*
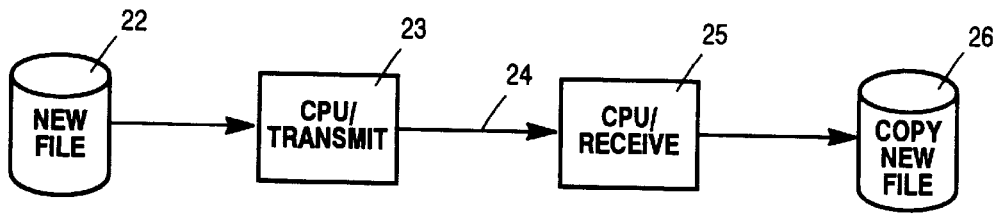
Figure 3B *(Prior Art)*
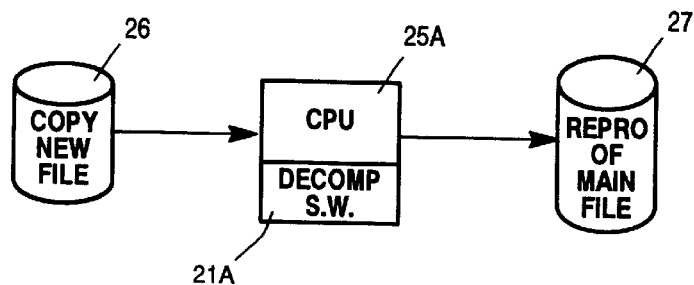
Figure 3C *(Prior Art)*

INTEGRATED BLOCK CHECKING SYSTEM FOR RAPID FILE TRANSFER OF COMPRESSED DATA

RELATED APPLICATIONS

The present invention relates to my copending U.S. application Ser. No. 09/104,115, filed Jun. 24, 1998 for A System For High Speed Continuous File Transfer Processing of Data Files.

BACKGROUND OF THE INVENTION

1. Field of the Invention

The present invention relates to a system and method for checking the integrity of data files transferred at high speeds in compressed format.

2. Description of the Prior Art

Some systems for transferring very large files using multiplex communications are classified in class 370, subclasses 260+, 465+ and 536+. One such system is shown described in my U.S. Pat. No. 5,680,400 assigned to same assignee as the present invention. The system described therein splits data to be transferred into a plurality of streams for asynchronous transmission for the purpose of increasing the speed of the transfer over parallel lines, cables or phone links.

Another method of increasing the speed of data transmission is to compress the data without loss so that data being transmitted is in a format up to one-tenth its original size. Theoretically this would increase the speed of transmission by one order of magnitude. Data compression, while desirable, carries with it a loss of computer time during processing and other problems which are usually ignored. State of the art mainframe computers can easily format one million or more bytes per second. Data links and high speed networks presently used for high speed data transfer are capable of exceeding this data rate. Thus, data files whether compressed or not can be transferred over such data links at a minimum of time. Such transmission links are not always available in all locations of the world and it often becomes desirable to increase the rate of transmission of data over lines and links by employing data compression of the data files before transmission. It is not generally known that compressed data in compressed format is not fault tolerant and that the older and slower transmission lines and data link are more prone to causing transmission errors in the transmission path. Numerous data files concerning financial data, manufacturing data and inventory data are being transmitted over such lines. A typical example will illustrate the point. More and more world wide manufacturing and sales companies desire to transmit data concerning manufacturing needs, inventory and sales from all remote locations to a central location which has an enterprise computing system. The central system is usually capable of updating all data on a daily basis and generating reports and issuing orders and calculating data to maintain a balance of incoming parts with outgoing sales without depletion of sales items at any one location.

Accordingly, it would be most important that the data generated at remote locations is reproduced without error at the central location at a minimum of cost and time. When data compression is employed to increase the amount of data transferable in a given unit of time, the occurrence of errors in transmission can corrupt the compressed data to the point to where it is useless and/or meaningless in its decoded format.

It would be desirable to provide a method and apparatus for transferring large data files such as inventory and sales data from points all over the world to a central enterprise host system over various available communication lines and data links in compressed format which would ensure a very high degree of integrity of the data received and decoded.

SUMMARY OF THE INVENTION

It is the principal object of the present invention to provide a method and apparatus for enhancing the integrity of compressed and transmitted data.

It is a principal object of the present invention to provide a method and means for checking compressed data that has been transmitted to a receiver for decoding.

It is a principal object of the present invention to provide a method and means for checking compressed data that is virtually without cost of any kind to the system.

It is an object of the present invention to provide a method and apparatus for efficiently compressing and decoding data being transferred between remotely located computers.

It is an object of the present invention to provide an apparatus and a method for generating and inserting a novel block check code in a compressed data stream which is transparent to the encoder and decoder.

It is an object of the present invention to provide a novel block check code which can be cryptically inserted in a compressed or noncompressed data stream at low cost to prevent interception of confidential and proprietary data.

It is an object of the present invention to provide a block code generator for inserting a block check code after a predetermined large number n of fixed-length N-byte blocks so to be easily recognized by position.

It is the general object of the present invention to provide a method of checking transmitted data on the fly in one step.

According to these and other objects of the present invention there is provided a method for enhancing the validity of transmitted data files which comprises reading the data from a data file and formatting the data into alpha numerical characters which may be compressed by a known compression code which produces a variable length data stream. The new data stream is then divided into n blocks of N bytes where N represents an integer. A check code is inserted for each n blocks of N bytes to provide a data stream with a validity code enhancement embedded in the data stream.

BRIEF DESCRIPTION OF THE DRAWINGS

FIG. 1 is schematic block diagram of a prior art computer system arranged to transmit data in digital format over a telephone line;

FIG. 2 is a schematic block diagram of a prior art computer system equipped with a network interface card arranged to transmit data in digital format over a network;

FIG. 3A is simplified block diagram showing a computer arranged to read an original data file and create a new duplicate file;

FIG. 3B is a simplified block diagram showing a first computer arranged to read an original data file and transmit it asynchronously to a second computer which asynchronously reproduces the transmitted data as a new duplicate file;

FIG. 3C is a simplified block diagram showing a computer arranged to read and decompress a duplicate or compressed file and to provide a reproduction of the original data file;

DESCRIPTION OF THE PREFERRED EMBODIMENTS

Figure 4:
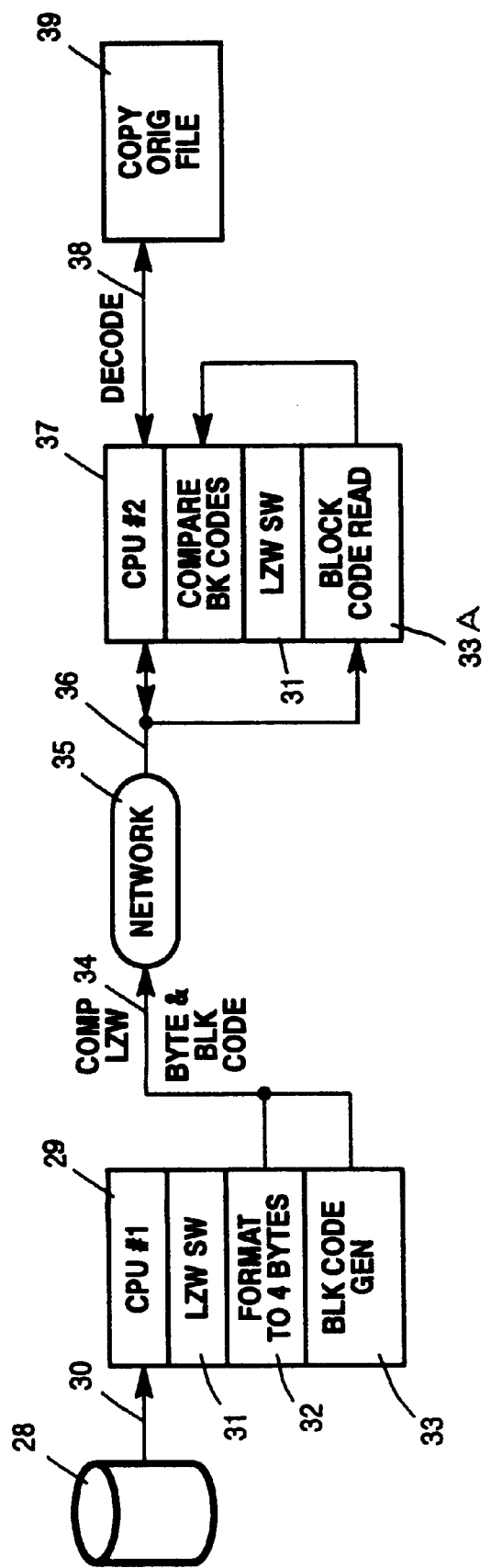
FIG. 4 is a simplified block diagram showing a preferred embodiment of the present invention which employs a first computer to transfer data files by formatting a data stream of variable length compressed code values and insert a block code in the data stream for transmission over available networks to a second computer which is capable of stripping off the block codes and checking the data stream to be stored in compressed and decoded or uncompressed format.

Refer now to FIG. 1 showing a schematic block diagram of a prior art computing system 10 arranged to transmit data in digital format over a telephone line. For purposes of this description the original data file 11 is shown as a main memory unit or disk file which is accessed by a host computing system 12 and the information is supplied through an internal or external modem 13 which is provided with means for compressing data in digital format that is supplied to a telephone line and telephone exchange 14 which in turn is placed on a telephone system 15 for transmission to a remotely located telephone exchange which is not shown in this particular drawing. In FIG. 1 the speed of transmission of the digital data through the telephone exchange and telephone system is the bottleneck or limiting factor for the speed of digital data. In the United States the telephone companies presently provide a standard line which will transmit only 56.5 kilobits per second. There are other types of telephone lines which will transmit more data but this is the most common in the United States at this time.

Refer now to FIG. 2 showing a schematic block diagram of a prior art computing system 10A equipped with a network interface card for transmitting data in digital format over a network. The same computer 12 as shown in FIG. 1 is provided with a network protocol stack 16 which interfaces with a network interface card 17 that produces digital data in package format on line 18 which is connected to the network 19. It is well known that information which is placed on the network may be taken off the network at a remote location and deciphered or decoded or reformatted to produce the original data. In the FIG. 2 embodiment the network provider 19 becomes the bottleneck. If the network provider uses any portion of the prior art telephone system this becomes the bottleneck. However, if the network provider and system is connected over a physically fast transport means then the speed of transmission may be enhanced up to the capability of the computer and its NIC card. Quite often the speeds of these NIC cards using a fast internet make it possible to transmit information accurately and economically at rates of 100 megabits per second.

Refer now to FIG. 3A showing a simplified block diagram of an original main file 11 which is accessed by a computer 12. The computer 12 is provided with a commercially available computer software program 21 to enable the computer 12 to compress the original main file and generate a new file 22 in a compressed format. In this embodiment the cables which connect the elements of 11, 12 and 22 are high speed cables and the process is only limited by the ability of the computer 12 to perform the compression algorithm.

Refer now to FIG. 3B showing a simplified block diagram of a system for transmitting the new file 22 and generating a copy of the compressed new file 22. The new file 22 is coupled to a computer 23 employed to transmit data over data link or cable or line 24 to a receiving computer 25 and to create the new file 22. The information in the new file is transmitted to a remote location and a copy of the new file 26 is generated. This system enables the accumulation of the original main file 11 in a new file for a rapid transmission over the line 24.

Refer now to FIG. 3C showing a simplified block diagram of the computer system 25A arranged to take a copy of the new file 26 and reproduce it as a new main file 27. In this embodiment the copy of the new file 26 is first decompressed by computer 25A using decompression software 21A similar to the software 21 to produce an expanded and decoded file of new file 26 and then end up with a reproduction 27 of the main file 11.

Summarizing FIGS. 1, 2, 3 it will be understood that the prior art systems were not adapted for efficient utilization of the computers nor where they designed for rapid transfer of information from one remote location to a central location where the files could be processed.

Refer now to FIG. 4 showing a simplified block diagram of a preferred embodiment of the present invention in which a first computer is employed to transfer a data file from a first location over a network in a compressed format and to receive the information in the compressed format at a second computer which is capable of stripping off block codes and checking the data stream for errors before decoding the compressed information into its original format which is then stored as a data file. In the preferred embodiment system shown in FIG. 4 the data file 28 may be in any form including disk or tape and other forms such as solid state memory which may be accessed and stored at high speed by the computer 29 shown as CPU 1. CPU 29 is provided with numerous application software packages and operating systems and here includes a lossless data compression software package shown as LZW 31. Another software package 32 includes software for formatting the data stream on line 30 into blocks of four bytes each of which comprises eight bits. The formatting software 32 enables the CPU 29 and the software 31 to output Lepel/Ziv/Welch codes of variable length at the output on line 34 and to insert after n groups of N number of bytes a block code generated by block code generator 33 in the data stream. Thus it will be appreciated that the data stream 30 has been compressed in CPU 29 such that recurring strings have been replaced and has been error correction coded, to form a stream of codes on line 34 which includes somewhere in the stream or at the end of a predetermined number n of blocks, a block error code of 32 bits. The block error code is a check sum of the bits in the data stream between block codes. Line 34 is shown schematically connected to a network 35 which may comprise for example a transport control protocol/internet protocol (TCP/IP). The network may include software and/or hardware and/or at least one of the operational boards in the computer 29. This may also include one of the interface boards to the network. The network 35 is shown connected by line 36 to computer 37 shown as CPU 2. The computer 37 also is provided with a proper interface to receive the information on the network. The information comprises a stream of blocks of data codes periodically provided with block codes which may be a sum check, a redundancy check or other suitable check codes. The data stream is directed into the computer 37 and the block code is read at 33A. The data decompression block shown as LZW decodes the data stream in computer 37. When a block code is read in block 33 it is compared in computer 37 with the same block code that is generated from the incoming data stream 36 even though it is in an encoded format. When the read block code 33 compares with the again regenerated block code in computer 37 the bits of the data stream are checked for at least one error in the data stream. The decoded information on line 38 may now be recorded in new file 39 which comprises an original copy of the file information transmitted from file 28 across the network 35 to the new file 39. It will be understood that computers Located anywhere in the world may assimilate critical information and format it into a compressed data stream with a check block code and transmit it over a network which could comprise a bottleneck for speed of transmission, to a centrally located enterprise computer 37. The computer may store the information for later use and for processing in file 39. Further, it would be understood that more than one remote site can have a computer CPU 1 and a file 28 for processing and transmitting information to an enterprise computer for later processing. The information being transmitted may be done on the fly in a continuous stream and collected in the data file 39 for further processing at a later time. When information is being supplied from different data centers around the world it can be stored until all of the information to be processed is accumulated in one master file 39 which comprises numerous original files from remote locations. In the preferred embodiment of the present invention the file transfer system CPU 1 may comprise a Unisys NX or A series mainframe computer, a Unix based server or computer, a IBM MVS computer, an IBM AS400™ computer or any of the computers which employ Windows NT™, Windows 95™ etc operating systems.

Figure 5:
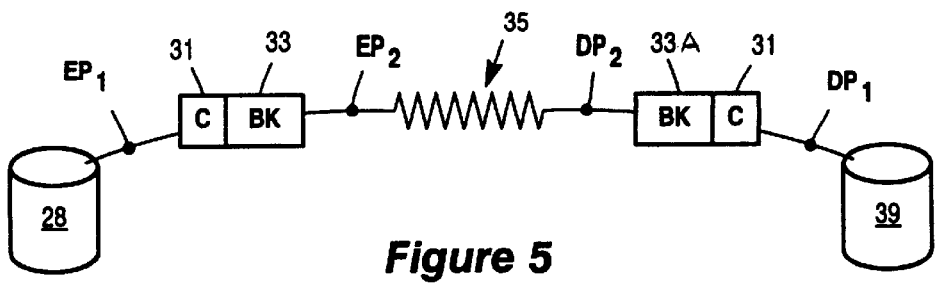
FIG. 5 is a simplified block diagram illustrating the points in a data stream where compression and block error codes are generated and inserted as well as the point in the data stream where encryption may be performed.

Refer now to FIG. 5 showing a simplified block diagram illustrating the points in a data stream of the type shown in FIG. 4 where data compression and block error codes are generated and inserted as well as the points in the data stream where encryption may be performed. The data file 28 shown in FIG. 4 is shown producing a data stream having a point EP1 where the data stream may be first encrypted. The encrypted data stream may be compressed by block 31 which corresponds to the LZW software block 31 in computer 29 of FIG. 4. Further, the block code generated by generator 33 at computer 29 is shown inserting a block code into the data stream. If the data stream was not encrypted at point EP1 it may now be encrypted at point EP2. After being compressed and encrypted, the data stream is transmitted over the network 35 and if encrypted at point EP2 it must now be decoded or decrypted at point DP2. In either case the data stream is stripped of its block code at block 33A and decompressed or decoded at block 31. If the data stream had been encrypted at point EP1 it may now be decrypted or decoded at point DP1 and the original information stored in data file 39 as explained with reference to FIG. 4. In the embodiment shown in FIG. 5 any time encryption is used on the data stream in conjunction with a compression algorithm either before or after the encryption it becomes extremely difficult to unscramble the information being transmitted because it does not conform to standard procedures for analyzing encrypted information. Stated differently examination of a Lempel/Ziv/Welch encoded data stream which comprises variable length block codes presents an almost insurmountable problem of decryption unless the actual encryption algorithm is known.

Figure 6:
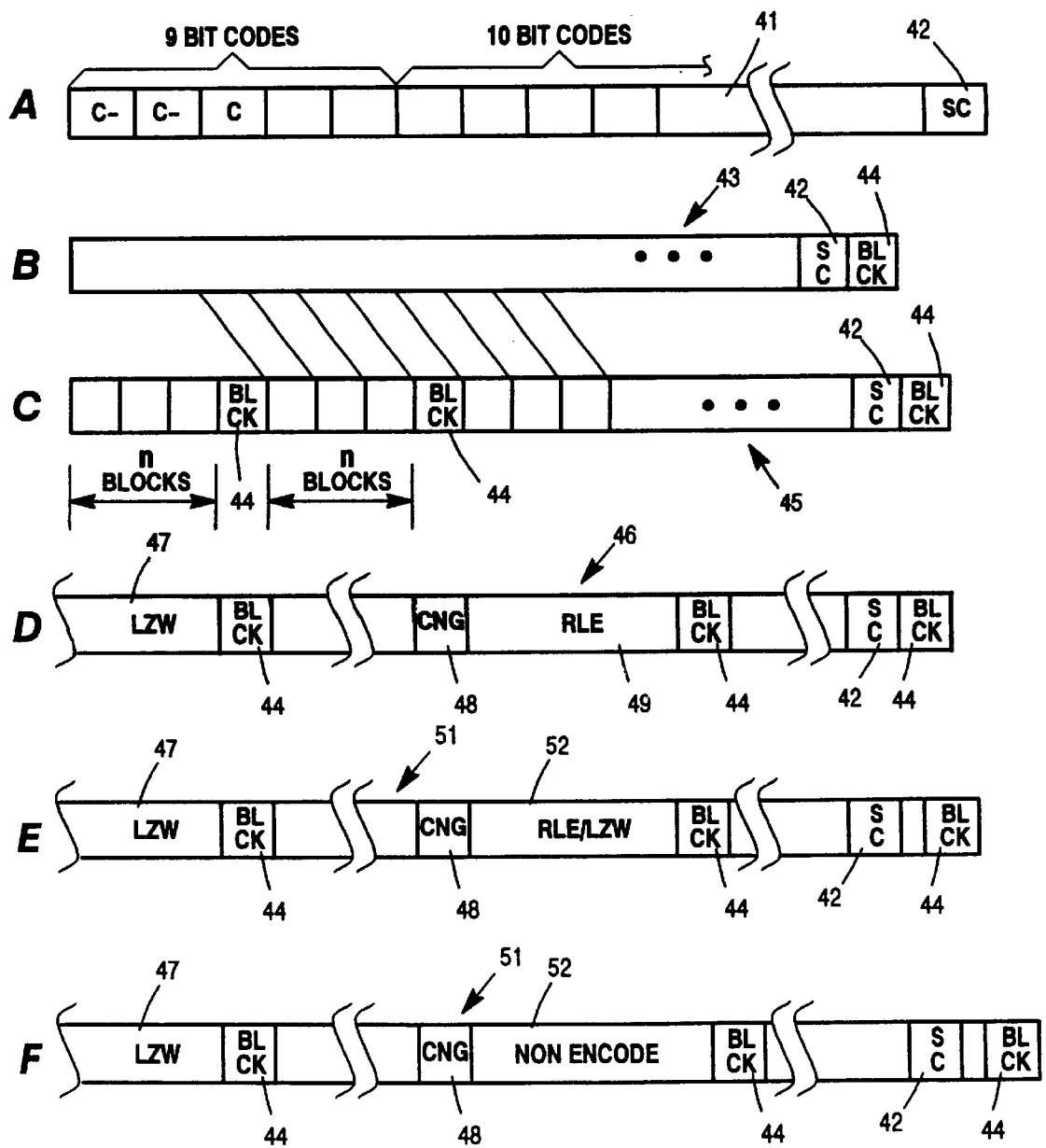
FIG. 6 is a schematic block diagram of six data stream formats illustrating the placement of special codes in the data stream for data being transmitted and/or stored.

Refer now to FIG. 6 showing a schematic diagram of six data stream formats which illustrate the placement of special codes in the data stream for data being transmitted and stored from a remote location. Data stream A is shown comprising a series of nine bit codes. Lempel/Ziv/Welch (LZW) codes are selected, preferably in numerical order and the lower code numbers may be transmitted with fewer than nine bits. When the dictionary addresses for strings of alphanumerical characters are all used, the 9 bit code values will be followed by the 10 bit codes and the 10 bit codes will be followed by the higher number codes. The data stream 41 is shown having a stop or end code 42 which denotes one of the special codes used in the preferred embodiment of the present invention.

Refer now to data streams B & C which comprise streams 43 & 45 both having stop codes 42 & block codes 44. In the preferred embodiment in the present invention the compressed data stream 43 is in its original stream form and is formatted by CPU 29 into the stream 45 by insertion of block codes 44 between groups of n blocks and a block code is also inserted at the end of the stream whether or not n number of blocks have been reached. A stop code 42 is provided and a block code 44 is produced for the information preceding the stop code 42. Thus, in the preferred embodiment of the present invention it is not necessary to fill the last number of n blocks before producing the block code 44 at the end.

Refer now to data stream 46 at D shown having a stream of code values 47 shown as LZW code. As explained before, the block codes 44 follow n number of blocks for checking the values for a single error. In data stream 46 there is shown a change code 48 which is used to denote a change from LZW coding to run length encoding (RLE) as shown at 49. RLE coded information is also coded with a block code 44 and a block code 44 follows every n number of blocks. The last portion of the data stream 46 is shown having a stop code 42 which follows the compression code and this is followed by a block code 44. A last block code 44 follows information that proceeded a last stop code 42.

Refer now to data stream 51 at E which is similar to data stream 46 shown at D. In this data stream LZW compressed code 47 is changed at change code 48 to a double data compression code which comprises first run length encoding (RLE) which is further compressed by LZW encoding. This information is treated as single coded information in n blocks followed by a block code. At the end of the data stream following a stop code a last block code 44 is appended to the stream. A more detailed explanation of combining two data compression codes is described in our U.S. Pat. Nos. 4,558,302 and 4,971,407 incorporated by reference herein.

Refer to stream F shown as stream 51 in which the LZW code 47 is changed as to indicate a change code 48 to a non encoded block of information shown at 52. At times it is more efficient to not encode information because the format may be such that it actually expands rather than contracts during the attempted data compression process. In the same manner as explained before, a block code 44 is inserted after n blocks in the data stream 51. A stop code 42 follows the block code 44. Having explained the data streams A to F and how a block code—may be inserted every n blocks, which could comprise a variable number of bits, it will be appreciated that the block codes 44 may be inserted at different places in the data stream as long as the transmitting party and the receiving party both know where to place the codes and where they may be recovered. For example, a block code which includes a special code that provides the receiver with the exact location of the next block code may be inserted in the data stream. This may vary from special code to special code as long as the decoder is capable of decoding the information provided. Another variation of the same concept would include a skip code in which the transmitter and receiver had prearranged to place their block codes at various locations in the data stream measured in either bits or blocks. Thus, the data stream can not be deciphered by a person receiving the data stream without having the additional information and/or an encryption key as to where the block codes would occur. In the preferred embodiment in the present invention the information is transmitted without interruption and received in as fast as the network allows. Then the data can be decoded at a different speed and stored for a future use. If operators of the preferred embodiment system desired to make the system completely fool proof they could embed information in the data stream which could only be decoded and found after the complete data stream is transmitted. Further, depending on the compression algorithm employed it can be predetermined how often the block check code must be inserted in the data stream. As a general rule it is best to place the block code in the data stream prior to a point where degradation of the integrity of the data begins. Since this point occurs so seldom as a fraction of one percent, it is possible to place block codes in any of the data streams explained above without losing more than one fifth of one percent of the data time or increasing the amount of transmission time by one fifth of one percent.

Figure 7:
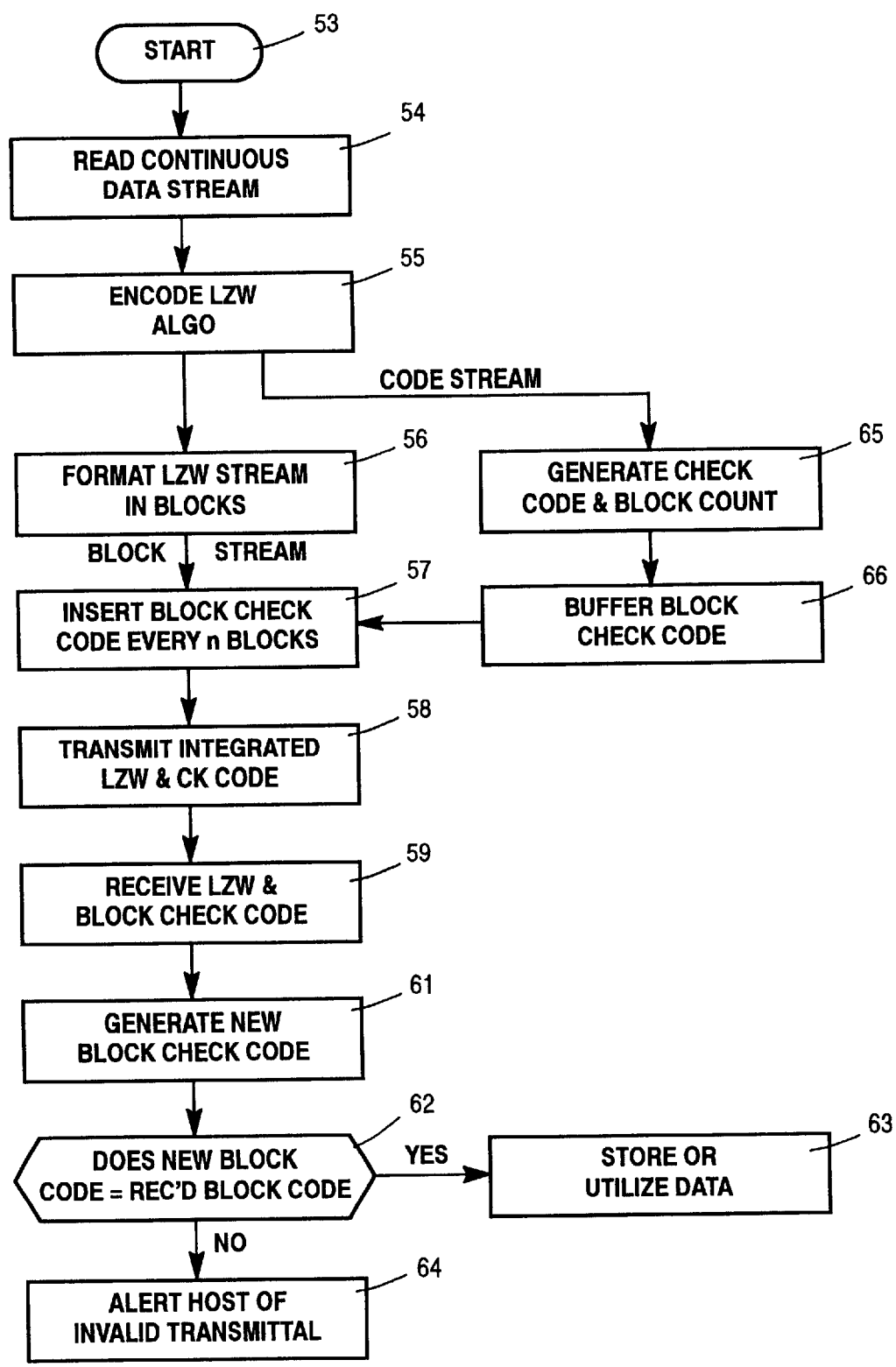
FIG. 7 is a schematic block diagram illustrating a preferred embodiment example of steps employed to insert error checking block codes in a variable length data stream.

Refer now to FIG. 7 showing a block flow diagram illustrating the preferred embodiment steps employed to insert error checking block codes into a stream of variable length data compression codes. There is shown in FIG. 4 a continuous data stream being fed to a computer 29. The start of the data stream at block 53 results in the computer reading the continuous data stream at block 54 and the computer 29 encodes data, using the LZW algorithm at block 55 which is then formatted into blocks of information comprising a predetermine number of bits which comprise a predetermine number of bytes as shown in block 56. After n blocks the check code is inserted as shown at block 57 and this information is transmitted as a continuous data stream which is integrated as shown at block 58. The data stream is received as shown in FIG. 4 by computer 37. At the block 59 the computer 37 effectively generates the same block code as computer 29 using the transmitted data stream without the block code as shown at block 59. A newly generated block code at block 61 is compared in computer 37 to the transmitted block code 44 to determine if the new block code is equal to the received block code as shown at block 62. When this occurs the information may be stored as being proofed for errors as shown at block 63. If not, the computer 37 at block 62 raises an error signal to alert the host computer 29 that the just received information is invalid and must be retransmitted as shown at block 64. At the same time the data stream is transferred to block 56 it is also used to generate a check code and to generate a block count as shown at block 65. This permits the computer 29 to generate a block code as shown at block 66 and to insert it into the data stream every n blocks as shown at block 57. Having explained FIG. 4 with reference to the steps shown in FIG. 7 it will be understood that some variations of the steps may be made at blocks 55 to 58 by using different codes and using the insertion technique at different places in the data stream.

Figure 8:
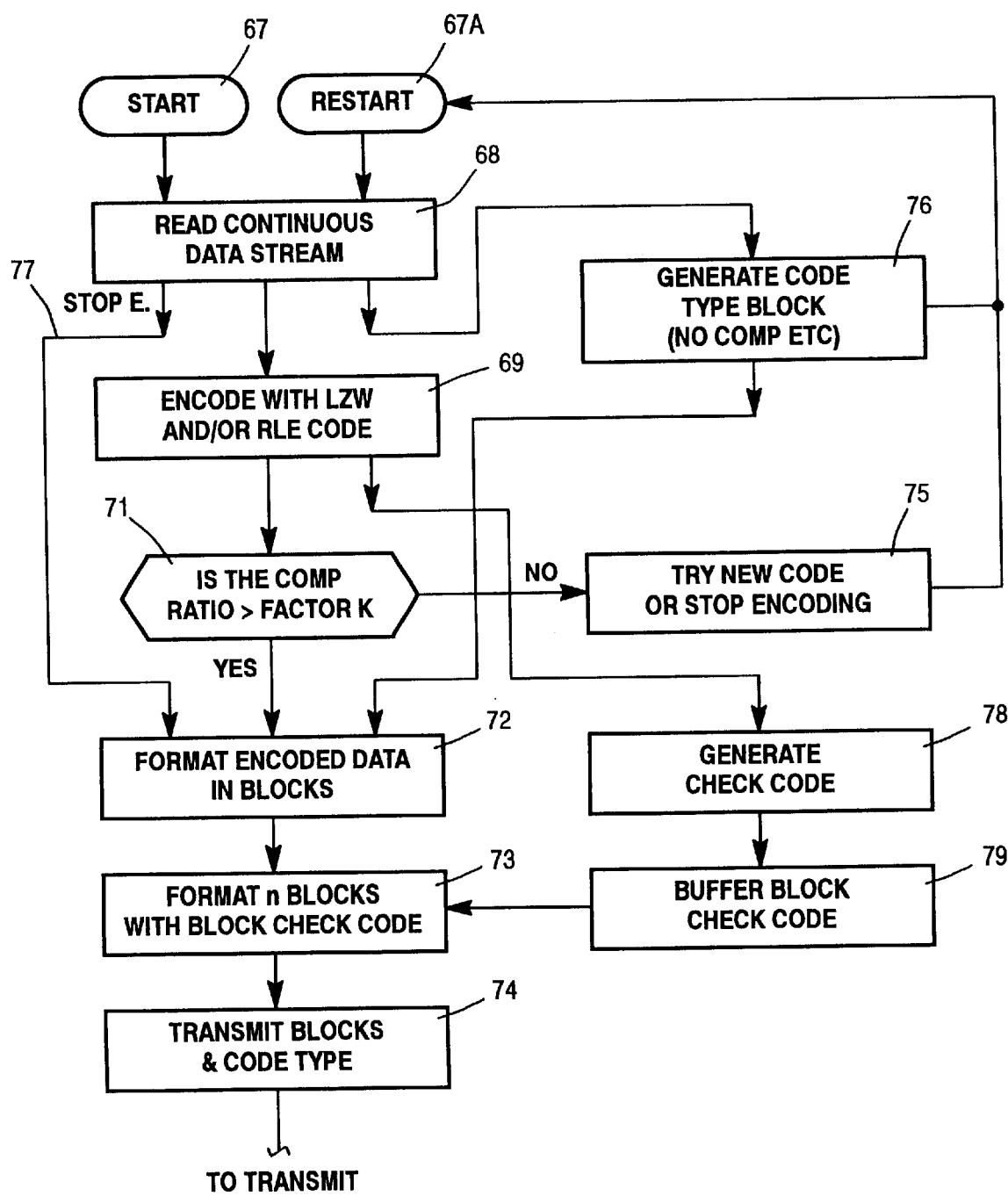
FIG. 8 is a schematic block diagram illustrating a preferred embodiment method of determining an efficient compression ratio of different codes which may or not be employed to compress the data stream.

Refer now to FIG. 8 showing a schematic block diagram illustrating a method of determination an efficient compression code comprising different codes and which may be made on the fly for use in block 55 of FIG. 7. Before explaining the preferred use of FIG. 8 it should be understood that if time permits, it is possible for an operator to examine the data to be transferred and to determine a most efficient compression code or no compression code before the attempt to transmit the information. Further, the user may have historical data which would indicate to the user which combination of compression codes operate most efficiently with the data to be transferred. FIG. 8 may be used as an on the fly test for an efficient compression code or may be used on site prior to providing the information to the network for transmission to an enterprise system. The method starts at block 67 and causes the continuous data stream to be read at block 68. The data stream is encoded with an efficient compression code at block 69 which applicants have found to comprise either LZW or RLE on top of LZW. The bits being encoded in the data stream may be summed before and after compression so as to produce a ratio of input bits or bytes compared to the output bits or bytes to produce the compression ratio factor K at block 71. If the compression ratio only compresses by a factor of about 10–15% compression, then the burden of compressing the data and slowing down the data stream is not worth the cost to the system. If the data is properly compressing, the data stream is formatted into encoded blocks of data as shown at block 72. A check code 44 is inserted after n number of blocks as shown at block 73 then the data stream is ready to be transmitted as a compressed data stream with embedded block[s] codes as shown at block 74. This information passes to a transmitter of the type shown in FIG. 4. If at block 71 the compression ratio factor indicated that the compression code being used was not producing satisfactory results a new code could be tried as shown at block 75. This information is preferably used to restart the transmission of data and to restart the new compression algorithm. Thus, when the data stream is read at block 68 it is necessary to generate a new special code as shown at block 76 indicating the compression code being employed. This information is passed to formatting block 72 prior to the time the check code is inserted into the data stream comprising blocks of data separated by the check code shown at block 73. Whatever code is being employed, the same technique is employed to generate a check code as shown at block 78 and the inserted block check code 44 is shown being inserted at block 79 into the stream which passes through block 73. It will be understood that the steps explained with reference to FIG. 8 are very broad but illustrate an on the fly change of data compression techniques for use with the system shown in FIG. 4.

Figure 9:
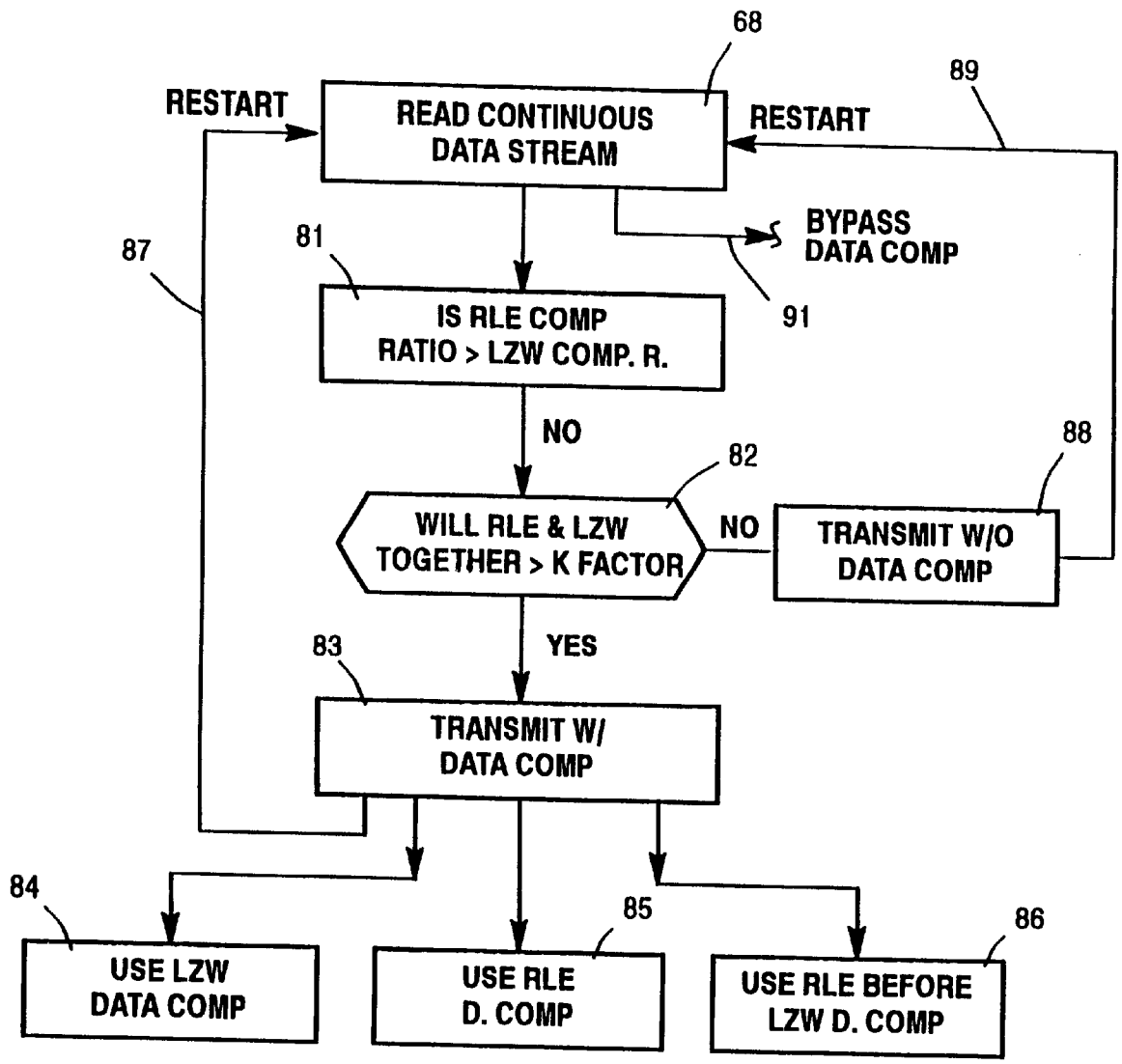
FIG. 9 is a schematic block diagram illustrating a method for determining on the fly a predetermined one of selected data compression codes which can be used to efficiently compress the data stream.

Refer now to FIG. 9 showing a schematic block diagram of a method for determining on the fly which of the predetermined set of data compression codes can be used to efficiently compress the data stream. When the continuous data stream is read at block 68 (also shown in FIG. 7 and 8) the data stream is preferably compressed using LZW data compression or RLE data compression. The determination is made at block 81 whether one or the other produces a more desirable data compression ratio. It may then be determined whether a combination on RLE followed by LZW will produce an even greater compression ratio as shown in block 82 in which case it may be possible to transmit with one of the three compression ratio techniques as shown at block 83. Block 83 also produces a block indication at one of the blocks 84, 85 or 86 which of the data compression ratio techniques should be used and also produces a restart signal on line 87 which is used to restart the data stream as explained herein before employing the selected form of data compression. It is possible at block 82 to make a determination that the data is not properly responding to an attempt to compress the data and it is desirable to continue transmitting the data stream without performing data compression as shown at block 88. When this occurs, the block 88 must produce a restart signal on line 89 to inform the system that no further data compression should be performed on the data stream and the data stream is then not compressed as shown on line 91. The block code 44 is still inserted in the data stream.

Figure 10:
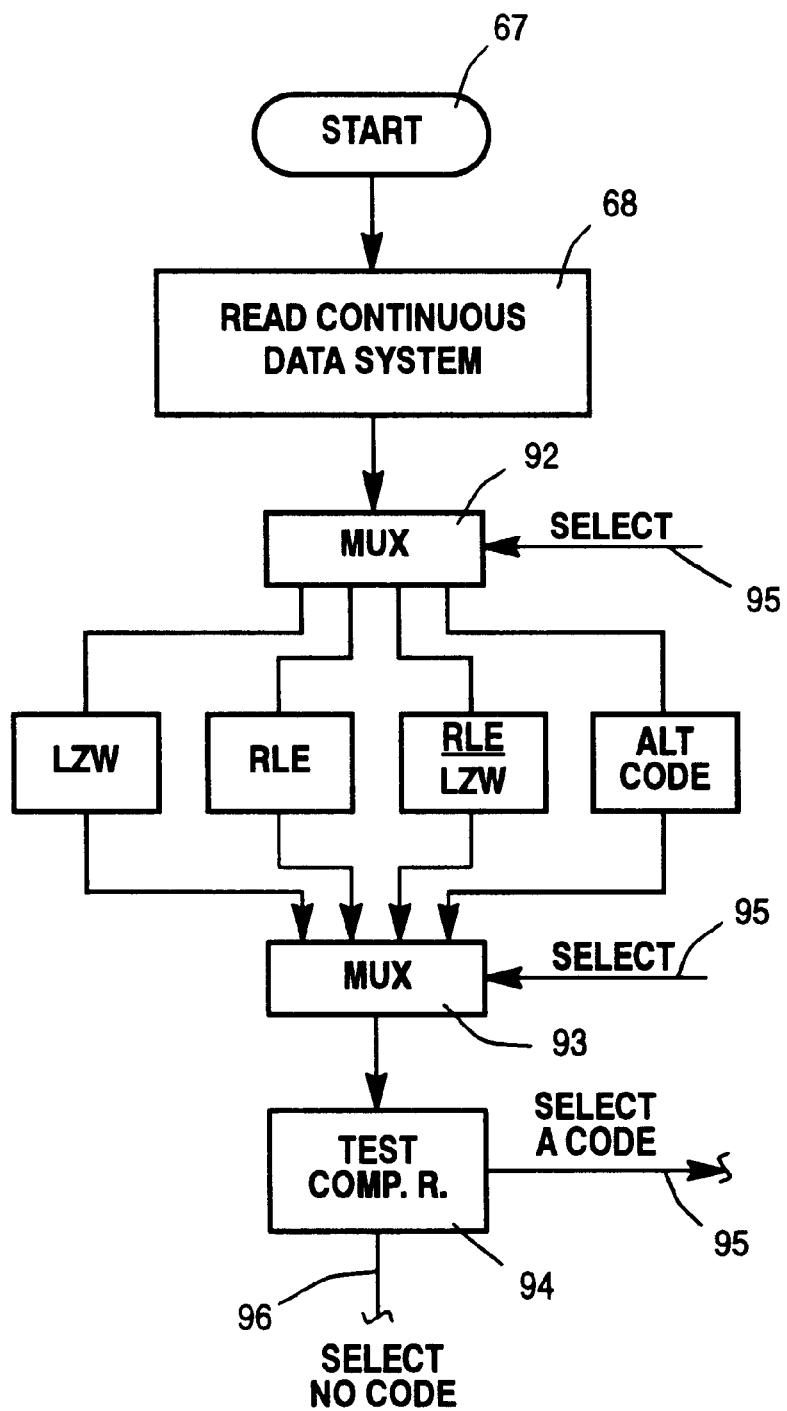
FIG. 10 is a schematic block diagram illustrating an apparatus in steps for carrying out tests to determine the most efficient data compression code or combination of codes for use in compressing a data stream.

Refer now to FIG. 10 showing a schematic block diagram illustrating an apparatus and steps for carrying out tests to be used to determine the most efficient compression code similar to FIG. 9. The selection sequence is shown started at block 67. The continuous data stream is read at block 68 to produce a data stream at mux 92 that has a select line 95 which will divert the data stream into one of the four algorithms shown and produce an output of a compressed data stream at mux 93. From a hardware point of view mux 93 and select line 95 may be omitted because the output of the compression code generator shown are being produced sequentially at the time in the computer performing the compression algorithm, thus, the compressed data performed by one of the compression algorithms is inputted into a block 94 which compares the compression ratio for each of the different codes and preferably selects the code with the highest compression ratio on line 95. Code selection signals may be used in FIGS. 7 to 9 to continuously select the preferred compression ratio technique. However, if the test comparison ratio block 94 determines that the data is not properly compressing it is possible to select none of the available data compression algorithms and the data is transmitted without data compression. FIG. 10 illustrates a system which will permit on the fly selection of one or more compression codes without a restart and is equally applicable to other well known compressing codes.

Having explained a preferred embodiment of the present invention and variations thereof, it will be appreciated that data compression does not include an integrity check and the use of data compression techniques could corrupt a stream of data. Thus, the present invention provides an integrity check of the information being transmitted in one continuous, real time (on the fly) operation with a checking step which does not degrade the efficiency of the system. In the preferred embodiment of the present invention 8 bit bytes are employed and 32 bits (4 bytes) are used for a check sum block code. This check sum block code is inserted every 2000 to 6000 bytes which represents an insignificant penalty in the data stream of less than $\frac{1}{10}^{th}$ of 1% of the time. It has been found that even this error checking block code substantially enhances the integrity of data which may be corrupted by any one of a plurality of network links, or lines through which the data flows. It has been found that the integrity of the data is not corrupted in the computer but in the transmission over numerous routes, thus, the present invention provides a means for insuring that data produced at one end arrives unimpaired at the other end.

Since corruption of data is usually a function of errors in transmission over communications lines, the present invention will be seen to detect those errors. As more and more information is arranged in digital packets for transmission in a digital protocol there are expected to be loss packets, out of sequence packets and packets with digital errors, some of which are detectable in the packet receiving protocol. By arranging data into blocks and checking the block error code of the present invention, the receiver will force the transmitter to send an error free block without knowing where the error occurred.

Thus, the receiver, decodes the retransmitted blocks of compressed data, and then decodes the stored blocks of compressed data before decoding new blocks of compressed data in said compressed data stream.

This method prevents any error of any type in a stream of compressed data from contaminating subsequent blocks of compressed data in the same stream and provides for fast efficient transmission of uncorrupted data over all forms of transmission means.

What is claimed is:

1. The method of decoding a compressed data stream representative of a data file being transmitted from a remote site over conventional network framing protocol lines, comprising the steps of:

a. extracting n blocks of variable bit length encoded compressed data and an accompanying block error code from network protocol frames, b. storing said extracted n blocks and accompanying block error code in a first memory of a computer, c. stripping the block error code from the end of said n blocks of said compressed data stream, d. generating a new block error code from the data in said compressed data stream as it is received, e. comparing the newly generated block error code with the block error code stripped from the end of said n block compressed data to determine if each block of compression code values is valid and usable, f. decoding the n blocks of compressed data as long as the block error codes match, g. storing blocks of compressed data after said block error codes do not match, h. requesting a retransmittal of the blocks of data in which the block error codes do not match, i. repeating steps d, e and f until the block error codes match, j. decoding the retransmitted blocks of compressed data, and k. then decoding the stored blocks of compressed data before decoding new blocks of compressed data in said compressed data stream.

2. The method as set forth in claim 1 which further includes the step of, raising an error signal in a computer so that the stored compressed data stream which included the block error will not be used.

3. The method as set forth in claim 2 wherein raising said error signal further includes means for requesting a retransmittal of the block of data which included the block error.

4. The method as set forth in claim 1 which further includes raising a signal indicating an error free transmission, and storing the compressed data stream in a data file.

5. The method as set forth in claim 4 which further includes the step of decoding the compressed data stream for use or for storage in a data file.

* * * * *